United States Patent
Mukherjee et al.

(10) Patent No.: US 12,510,955 B2
(45) Date of Patent: Dec. 30, 2025

(54) MANAGING POWER CONSUMPTION IN DATA PROCESSING SYSTEMS

(71) Applicant: Dell Products L.P., Round Rock, TX (US)

(72) Inventors: Rishi Mukherjee, Bangalore (IN); Sudhir Vittal Shetty, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/417,376

(22) Filed: Jan. 19, 2024

(65) Prior Publication Data

US 2025/0238070 A1    Jul. 24, 2025

(51) Int. Cl.
*G06F 1/00* (2006.01)
*G06F 1/3296* (2019.01)
*G06F 11/30* (2006.01)

(52) U.S. Cl.
CPC ........ *G06F 1/3296* (2013.01); *G06F 11/3062* (2013.01)

(58) Field of Classification Search
CPC .............. G06F 1/3296; G06F 11/3062
See application file for complete search history.

(56) References Cited

U.S. PATENT DOCUMENTS

| | | | |
|---|---|---|---|
| 10,666,279 B1 * | 5/2020 | Schurmann | H03M 1/1023 |
| 2015/0312086 A1 | 10/2015 | Terwilliger | |
| 2018/0329768 A1 | 11/2018 | Bikumala | |
| 2023/0117047 A1 * | 4/2023 | Francis | G06F 9/4893 |
| | | | 718/104 |
| 2023/0239809 A1 * | 7/2023 | Mukherjee | H04W 72/0473 |
| | | | 455/142 |
| 2024/0193062 A1 * | 6/2024 | Varma | G06F 1/324 |

OTHER PUBLICATIONS

ServiceNow. (Mar. 26, 2018). "Incident Management." ServiceNow Documentation. <https://www.servicenow.com/community/s/cgfwn76974/attachments/cgfwn76974/it-service-management-forum/254880/1/Incident%20Management.pdf> (81 pages).

* cited by examiner

*Primary Examiner* — Mohammed H Rehman
(74) *Attorney, Agent, or Firm* — WOMBLE BOND DICKINSON (US) LLP

(57) ABSTRACT

Methods and systems for managing power consumption in data processing systems are disclosed. The power consumption in the data processing systems may be managed by obtaining power limits for the data processing systems. The power limits may be determined by computing the power limits from regularly updated parameters of the data processing systems. The data processing systems may include data processing systems that are housed in racks. From the regularly updated parameters, rack power limits may be obtained. Using the regular parameters and the rack power limits, data processing system power limits may be obtained for the data processing systems.

20 Claims, 11 Drawing Sheets

| Rack | Maximum Rack Power Capacity (W) | Device Name | *DWP | *RWP | Rack Power (W) | *DPS Power Limit (W) |
|---|---|---|---|---|---|---|
| R1 | 9000 | S1 | 5 | 10 / 36 = 0.28 | 12000 * 0.28 = 3360 | 1680 |
| | | S2 | 3 | | | 1008 |
| | | S3 | 2 | | | 672 |
| R2 | 10000 | S4 | 5 | 15 / 36 = 0.42 | 12000 * 0.42 = 5040 | 1680 |
| | | S5 | 5 | | | 1680 |
| | | S6 | 3 | | | 1008 |
| | | S7 | 2 | | | 672 |
| R3 | 12000 | S8 | 5 | 11 / 36 = 0.30 | 12000 * 0.30 = 3600 | 1636 |
| | | S9 | 3 | | | 982 |
| | | S10 | 3 | | | 982 |

*DWP = Dynamic Weighted Priorities
*RWP = Rack Weighted Priorities
*DPS = data processing system

FIG. 2C

| Rack | Device Name | *DPSEW | *PCW |
|---|---|---|---|
|  | Weight | 0.5 | 0.5 |
| R1 | S1 | 5 (max) | 3 |
|  | S2 | 3 | 5 |
|  | S3 | 2 | 6 |
| R2 | S4 | 5 | 9 (max) |
|  | S5 | 5 | 9 |
|  | S6 | 3 | 5 |
|  | S7 | 2 | 2 |
| R3 | S8 | 5 | 8 |
|  | S9 | 3 | 4 |
|  | S10 | 3 | 5 |

*DPSEW = data processing system efficiency weightage
*PCW = power consumption weightage

FIG. 2D

| Rack | Device Name | *DPSEW | *PCW |
|---|---|---|---|
| | Weight | 0.5 | 0.5 |
| R1 | S1 | 5/5 | 3/9 |
| | S2 | 3/5 | 5/9 |
| | S3 | 2/5 | 6/9 |
| R2 | S4 | 5/5 | 9/9 |
| | S5 | 5/5 | 9/9 |
| | S6 | 3/5 | 5/9 |
| | S7 | 2/5 | 2/9 |
| R3 | S8 | 5/5 | 8/9 |
| | S9 | 3/5 | 4/9 |
| | S10 | 3/5 | 5/9 |

*DPSEW = data processing system efficiency weightage
*PCW = power consumption weightage

FIG. 2E

| Rack | Device Name | *DPSEW | *PCW |
|---|---|---|---|
| | Weight | 0.5 | 0.5 |
| R1 | S1 | (5/5) * 0.5 | (3/9) * 0.5 |
| | S2 | (3/5) * 0.5 | (5/9) * 0.5 |
| | S3 | (2/5) * 0.5 | (6/9) * 0.5 |
| R2 | S4 | (5/5) * 0.5 | (9/9) * 0.5 |
| | S5 | (5/5) * 0.5 | (9/9) * 0.5 |
| | S6 | (3/5) * 0.5 | (5/9) * 0.5 |
| | S7 | (2/5) * 0.5 | (2/9) * 0.5 |
| R3 | S8 | (5/5) * 0.5 | (8/9) * 0.5 |
| | S9 | (3/5) * 0.5 | (4/9) * 0.5 |
| | S10 | (3/5) * 0.5 | (5/9) * 0.5 |

*DPSEW = data processing system efficiency weightage
*PCW = power consumption weightage

FIG. 2F

| Rack | Device Name | *DPSEW | *PCW | Score | Score Range | *DWP |
|---|---|---|---|---|---|---|
| | Weight | 0.5 | 0.5 | | | |
| R1 | S1 | (5/5) * 0.5 | (3/9) * 0.5 | 0.5 + 0.167 = 0.667 | 0.4 to 0.599 | 3 |
| | S2 | (3/5) * 0.5 | (5/9) * 0.5 | 0.3 + 0.277 = 0.577 | 0.4 to 0.599 | 3 |
| | S3 | (2/5) * 0.5 | (6/9) * 0.5 | 0.2 + 0.33 = 0.533 | 0.4 to 0.599 | 3 |
| R2 | S4 | (5/5) * 0.5 | (9/9) * 0.5 | 0.5 + 0.5 = 1 | 0.8 to 1.0 | 5 |
| | S5 | (5/5) * 0.5 | (9/9) * 0.5 | 0.5 + 0.5 = 1 | 0.8 to 1.0 | 5 |
| | S6 | (3/5) * 0.5 | (5/9) * 0.5 | 0.3 + 0.277 = 0.577 | 0.4 to 0.599 | 3 |
| | S7 | (2/5) * 0.5 | (2/9) * 0.5 | 0.2 + 0.111 = 0.311 | 0.2 to 0.399 | 2 |
| R3 | S8 | (5/5) * 0.5 | (8/9) * 0.5 | 0.5 + 0.444 = 0.944 | 0.8 to 1.0 | 5 |
| | S9 | (3/5) * 0.5 | (4/9) * 0.5 | 0.3 + 0.222 = 0.522 | 0.4 to 0.599 | 3 |
| | S10 | (3/5) * 0.5 | (5/9) * 0.5 | 0.3 + 0.27777 = 0.577 | 0.4 to 0.599 | 3 |

*DPSEW = data processing system efficiency weightage
*PCW = power consumption weightage
*DWP = dynamic weighted priority

FIG. 2G

| Rack | Maximum Rack Power Capacity (W) | *DPS Name | *DWP | *RWP | Rack Power (W) | *DPS Power Limit (W) |
|---|---|---|---|---|---|---|
| R1 | 9000 | S1 | 3 | 9 / 35 = 0.26 | 12000 * 0.26 = 3120 | 1040 |
| | | S2 | 3 | | | 1040 |
| | | S3 | 3 | | | 1040 |
| R2 | 10000 | S4 | 5 | 15 / 35 = 0.43 | 12000 * 0.43 = 5160 | 1720 |
| | | S5 | 5 | | | 1720 |
| | | S6 | 3 | | | 1032 |
| | | S7 | 2 | | | 688 |
| R3 | 12000 | S8 | 5 | 11 / 35 = 0.31 | 12000 * 0.31 = 3720 | 1692 |
| | | S9 | 3 | | | 1014 |
| | | S10 | 3 | | | 1014 |

*DWP = dynamic weighted priorities
*RWP = rack weighted priorities
*DPS = data processing system

FIG. 2H

MANAGING POWER CONSUMPTION IN DATA PROCESSING SYSTEMS

FIELD

Embodiments disclosed herein relate generally to managing power consumption in data processing systems. More particularly, embodiments disclosed herein relate to determining power limits to manage power used by data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2C-2H show tables illustrating calculations results used in operation of a system in accordance with an embodiment.

DETAILED DESCRIPTION

Figure 1:
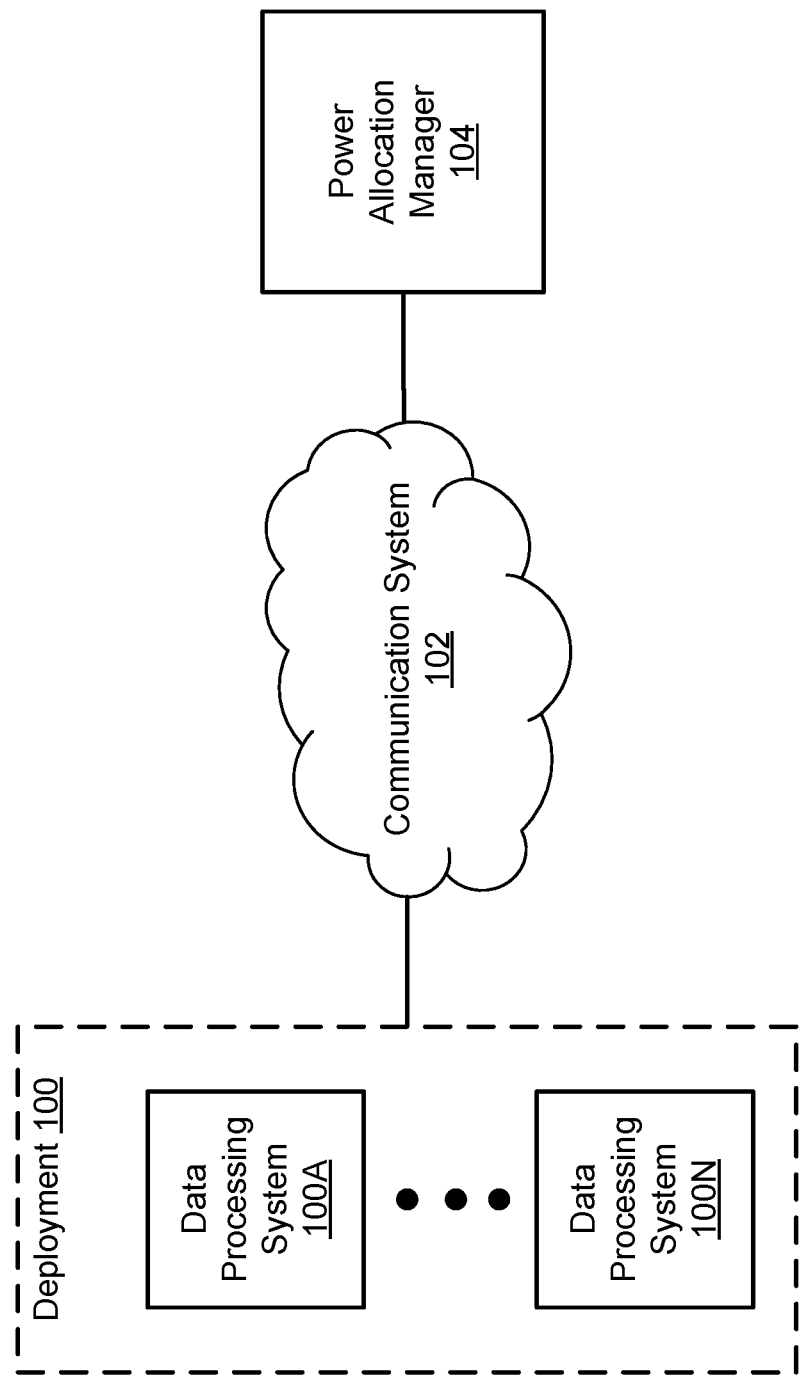
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing power consumption in data processing systems. The power consumption in the data processing systems may be managed by obtaining power limits for the data processing systems. The power limits may be determined by computing the power limits from regularly updated parameters of the data processing systems. The data processing systems may be housed in racks.

To compute the power limits for the data processing systems, telemetry data may be obtained by a power allocation manager. The telemetry data may include data processing system efficiency weights and power consumption weights. Also, the data processing systems may be regulated by a total budgeted power.

The telemetry data may be used to obtain dynamic weighted priorities for the data processing systems and rack weighted priorities for the racks. The rack weighted priorities and the total budgeted power may be used to obtain rack power limits. The rack power limits and the dynamic weighted priorities may be used to obtain data processing system power limits for the data processing systems.

In an embodiment, a method for managing power consumption in data processing systems is disclosed. The method may include: (a) obtaining telemetry data for the data processing systems; (b) obtaining, using the telemetry data, weights for the data processing systems; (c) obtaining, using the weights for the data processing systems, power consumption limits for the data processing systems; and (d) updating operation of the data processing systems to prevent the data processing systems from exceeding the power consumption limits.

The telemetry data may include first data based on data processing system efficiencies of the data processing systems and second data based on power consumptions of the data processing systems.

The data processing system efficiencies may indicate a level of workload performance of the data processing systems for a given level of power consumption by the data processing systems.

A data processing system efficiency of the data processing system efficiencies may be based, at least in part, on (a) a hardware component loadout of a data processing system of the data processing systems; (b) configurations of the data processing system; and (c) historical performance of workloads by the data processing system.

Obtaining weights for the data processing systems may include (a) obtaining the data processing system efficiencies and the power consumptions for the data processing systems using the telemetry data; (b) obtaining, using the data processing system efficiencies and the power consumptions, normalized data processing system efficiencies and normalized power consumptions; and (c) obtaining, using the normalized data processing system efficiencies and normalized power consumptions, weights for the data processing systems.

The power consumption limits may impose maximum power usages by the data processing systems.

Obtaining the power consumption limits may include (a) obtaining, based on the weights for the data processing systems, rack weights; (b) obtaining, based on the rack weights and a total power budgeted for use by the data processing systems, rack power limits; and (c) obtaining, based on the rack power limits and the weights for the data processing systems, the power consumption limits for the data processing systems.

The rack power limits may impose maximum power usages by a rack, the rack housing a portion of the data processing systems.

The rack weights may prioritize power for allocation to racks that house portions of the data processing systems, and the racks comprising the rack.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system may include data processing systems. The data processing systems provide the computer implemented services. During operation of the data processing systems, the data processing systems may consume power.

The total quantity of power available for use by the data processing systems may be limited. Consequently, brown outs or other undesirable outcomes due to the demand for power by the data processing systems exceeding the amount of power available for use by the data processing systems may occur.

In general, embodiments disclosed here relate to systems and methods for managing power consumption in data processing systems to reduce undesired impacts of demand for power exceeding the power that is available for consumption. The power consumption may be managed by dynamically allocating the power in data processing systems. The power may be allocated by collecting and processing telemetry data from the data processing systems.

The telemetry data may include data concerning data processing system efficiencies (e.g., quantity of computations performed per unit of power consumed) and power consumptions of the data processing systems. The data processing system efficiencies may be a prioritization based on workload performance at a given level of power consumption. The power consumptions may be based on intake of power by the data processing systems over time.

The telemetry data may be collected and normalized, based on maximum values of data processing system efficiencies and power consumptions. From the normalized telemetry data, dynamic weighted priorities for the data processing systems may be obtained.

Using the dynamic weighted priorities for the data processing systems, rack weighted priorities may be obtained. The rack weighted priorities may be obtained because the data processing systems may be housed in one or more racks. The rack weighted priorities may prioritize power allocation for a set of racks.

From the total budgeted power of the data processing systems and the dynamic weighted priorities, an amount of power allocated to each rack may be obtained. Using amount of power allocated to each rack and the dynamic weighted priorities, a power limit for each data processing system may be obtained. The power limit for each data processing system may determine the maximum allowed power imposed on each data processing system.

Overtime, the power limits for each data processing system may be recalibrated. The power limits may be recalibrated by collecting a new set of telemetry data. The new set of telemetry data may be used to compute new dynamic weighted priorities, the amount of power allocated to each rack (e.g., based on the new dynamic weighted priorities), and the power limit for each data processing system in each rack.

By doing so, embodiments disclosed herein may be more likely to allocate power in a manner that improves the efficiency of computations performed by a system. Consequently, a system in accordance with an embodiment may perform more computations per unit time for a same power draw.

To provide the above noted functionality, the system may include deployment 100, and power allocation manager 104. Each of these components is discussed below.

Deployment 100 may include any number of data processing systems 100A-100N. Data processing systems 100A-100N may provide the computer implemented services. To manage power draw, data processing systems 100A-100N may limit their individual power draw based on instructions received from power allocation manager 104. To allow power allocation manager 104 to decide how to allocate limited available power, data processing systems 100A-100N may provide telemetry data and/or other types of information to power allocation manager 104.

Power allocation manager 104 may manage data processing system 100A-100N by establishing and enforcing power allocations. To establish the power allocations, power allocation manager may collect and process telemetry data from data processing system 100A-100N. The collection may take place at set intervals of time and/or while data processing system 100A-100N processes operations on data. The telemetry data may be processed to establish the power limits which may be imposed on data processing system 100A-100N by power allocation manager 104. Refer to FIGS. 2A-2H for additional information regarding establishing and enforcing power limits.

Figure 2A:
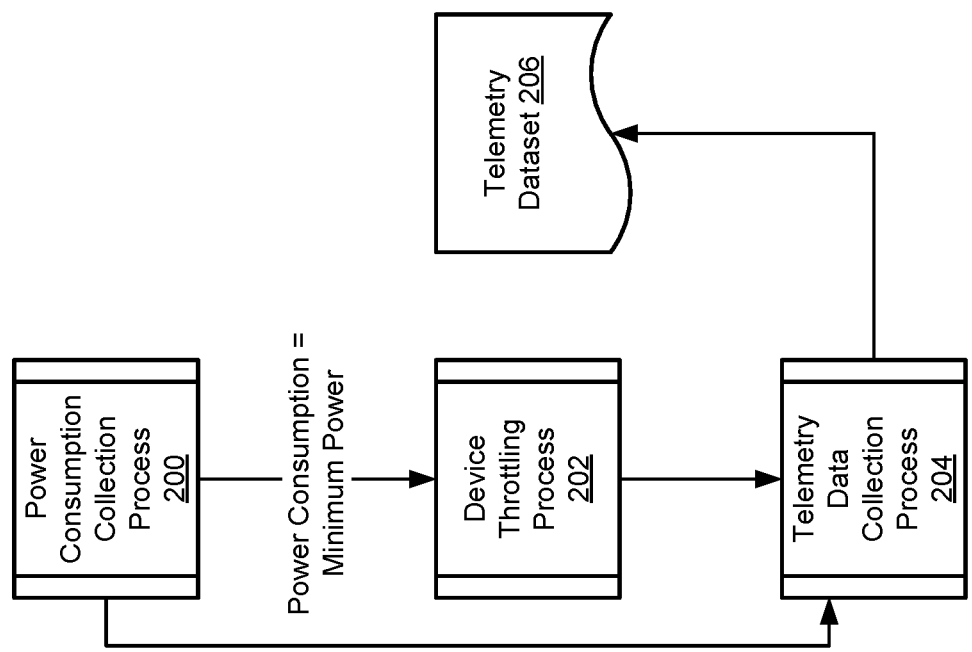
FIGS. 2A-2B show data flow diagrams illustrating operation of a system in accordance with an embodiment.
Figure 2B:
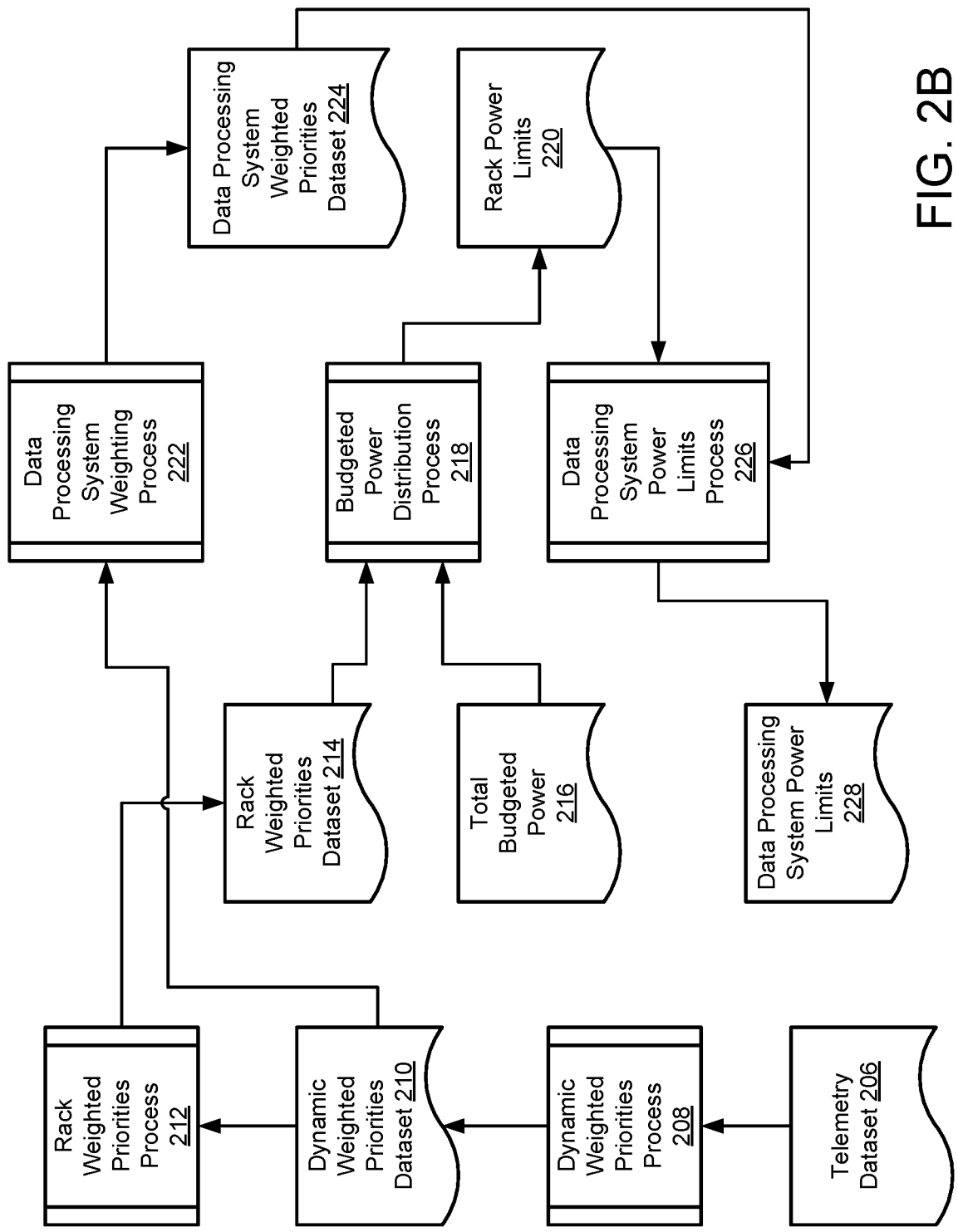
Figure 3:
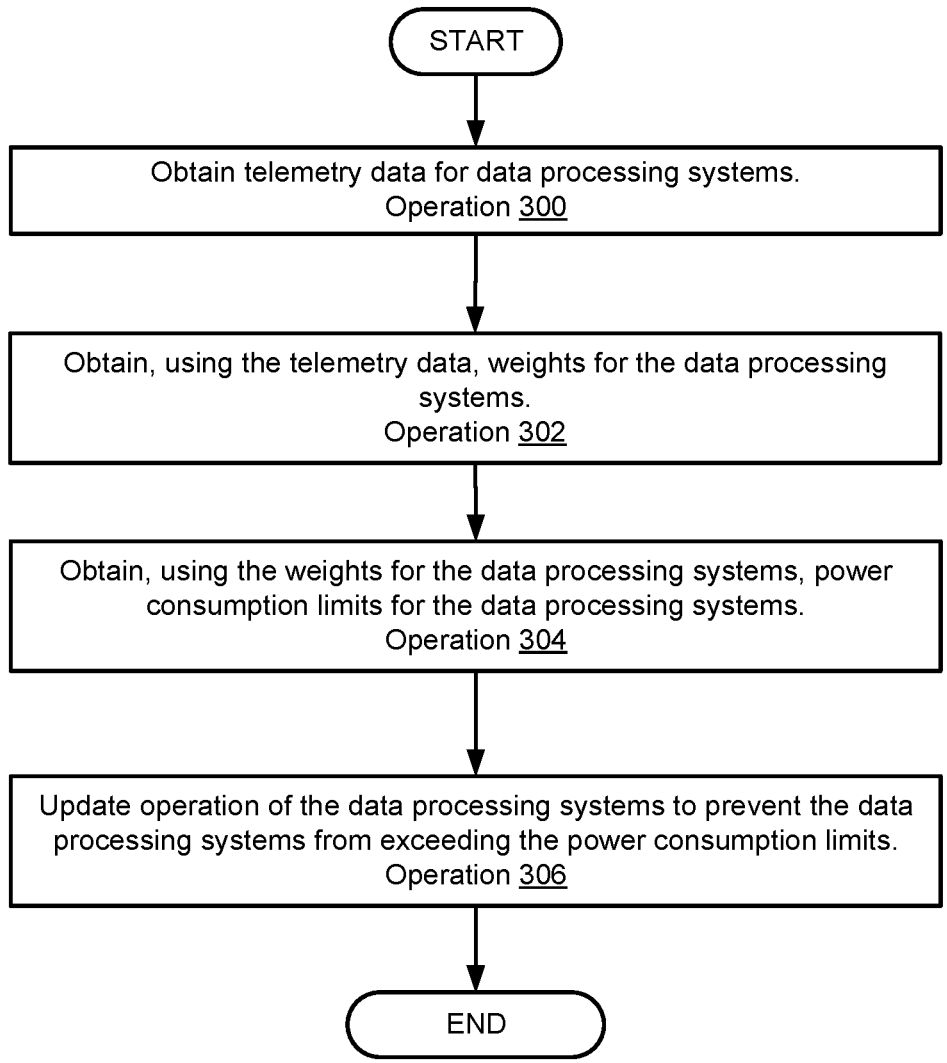
FIG. 3 shows flow a diagram illustrating a method in accordance with an embodiment.

While providing their functionality, any of deployment 100 and power allocation manager 104 may perform all, or a portion, of the flows and methods shown in FIGS. 2A-3.

Any of (and/or components thereof) deployment 100 and power allocation manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

For example, deployment 100 may include racks in which portions of the data processing systems are positioned. Additionally, each of the racks may include a power distribution units that distributes power from a power system to the data processing systems in a rack. Thus, a power system may impose a global limit on the amount of power to be distributed to each rack, and each power distribution unit in each rack may impose a limit on the amount of power that it may distribute to a portion of the data processing systems positioned in a corresponding rack.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 206, 210, etc.) is used to represent data structures and a second set of shapes (e.g., 200, 202, etc.) is used to represent processes performed using and/or that generate data.

Turning to FIG. 2A, a first data flow diagram in accordance with an embodiment is shown. The first data flow diagram may illustrate data used in and data processing performed in collection of a telemetry dataset.

To collect telemetry dataset 206, power consumption collection process 200 may be performed. During power consumption collection process 200, power allocation manager 104 may collect power consumption data from each data processing system within deployment 100. The power consumption data may include (i) data processing system names, (ii) dynamic weighted priorities of the data processing systems, (iii) rack names, (iv) rack mounting locations of each of the data processing systems, and (v) maximum power capacities for each of the racks, and power consumption weights and the data processing system efficiency weights for the data processing systems.

For each data processing system, if the power consumption matches or is greater than a minimum power needed by the data processing system to operate normally, then device throttling process 202 may be implemented. During device throttling process 202, the power consumption of the data processing system may be lowered below the minimum power to save power. Lowering the power consumption of the data processing system may allow for setting power limits of other data processing systems in a rack while avoiding exceeding a maximum power allocation for the rack. Otherwise, if the power consumption for the data processing system is less than the minimum power needed by the data processing system to operate normally, then device throttling process 202 may not be implemented.

For each data processing system, power allocation manager 104 may implement telemetry data collection process 204. During telemetry data collection process 204, the power consumption data may be used to obtain power consumption weights and data processing system efficiency weights. Power consumption weights may be scaled between 1 and 10 and may reflect power consumption consumed by the data processing systems. Also, data processing system efficiency weights may also be scaled between 1 and 10 and may reflect workload performance of the data processing systems. The power consumption weights and the data processing system efficiency weights may be included in telemetry dataset 206 and may be derived from an administrator-defined formula, such as a weighted sum. An example of power consumption weights and data processing system efficiency weights may be shown in FIG. 2D.

Turning to FIG. 2B, a second data flow diagram in accordance with an embodiment is shown. The second data flow diagram may illustrate data used in and data processing performed in obtaining data processing system power limits 228 for data processing systems.

To obtain data processing system power limits 228, dynamic weighted priorities process 208 may be performed. During dynamic weighted priorities process 208, dynamic weighted priorities dataset 210 for data processing systems in deployment 101 may be obtained. Dynamic weighted priorities dataset 210 may be obtained using data processing system efficiencies and power consumptions specified by telemetry dataset 206. The data processing system efficiencies may be divided by a maximum data processing system efficiency to obtain normalized data processing system efficiencies. An example of the normalized data processing system efficiencies may be shown in FIG. 2E. The normalized data processing system efficiencies may be weighted by multiplying them by a data processing system efficiency weightage to obtain normalized weighted data processing system efficiencies. An example of the normalized weighted data processing system efficiencies may be shown in FIG. 2E. The data processing system efficiency weightage may be obtained from telemetry dataset 206.

In addition, the power consumptions of each data processing system may be divided by a maximum power consumption to obtain normalized power consumptions. An example of the normalized power consumptions may be shown in FIG. 2F. The normalized power consumptions may be weighted by multiplying them by a power consumption weightage to obtain normalized weighted power consumptions. An example of the normalized weighted power consumptions may be shown in FIG. 2F. The power consumption weightage may be obtained from telemetry data set 206.

The normalized weighted power consumptions and the normalized weighted power efficiencies may be summed to obtain summed scores. An example of the summed scores may be shown in FIG. 2G. Using a user/administrator-defined conversion formula on the summed scores, each of which may range between 0 and 1, dynamic weighted priorities may be selected to be an integer between 1 and 5 for each summed score. An example of the dynamic weighted priorities may be shown in FIG. 2G. Dynamic weighted priorities dataset 210 may include the dynamic weighted priorities.

Once obtained, dynamic weighted priorities dataset 210 may be ingested in rack weighted priorities process 212. During rack weighted priorities process 212, rack weighted priorities dataset 214 may be computed from dynamic weighted priorities dataset 210. Rack weighted priorities dataset 214 may be computed by dividing a dynamic weighted priority for a data processing system on a rack by the sum of dynamic weighted priorities for all data processing systems on a rack. An example of rack weighted priorities may be shown in FIG. 2H. Rack weighted priorities dataset 214 may prioritize power allocation to racks that house portions of the data processing systems.

Once obtained, rack weighted priorities dataset 214 and total budgeted power 216 may be ingested by budgeted power distribution process 218. Total budgeted power 216 may be a total power available for all data processing systems. During budgeted power distribution process 218, total budgeted power 216 may be multiplied by rack weighted priorities dataset 214 to yield rack power limits 220. An example of rack power limits may be shown in FIG. 2H. Rack power limits 220 may include the maximum power consumption limits imposed on the racks that house the data processing systems.

To ascertain how each data processing system in a rack is to limit its individual power consumption to meet an imposed rack power limit, data processing system weighting process 222 may be performed. During data processing system weighting process 222 and for each data processing system, a dynamic weighted priority for the data processing system may be divided by the sum of all dynamic weighted priorities for the data processing systems in a rack. The dynamic weighted priorities may be aggregated as data processing system weighted priorities dataset 224. Data processing system weighted priorities 224 may include weights that prioritize power allocation of data processing systems within a rack.

Once data processing system weighted priorities data set 224 and rack power limits 220 are obtained, data processing system power limits process 226 may be performed. During data processing system power limits process 226, each data processing system weighted priority from data processing system weighted priorities dataset 224 may be multiplied by the rack power limit (specified by rack power limits 220) for the rack in which it is obtained to obtain a data processing system power limit. The data processing system power limits for each of the data processing systems may be aggregated to obtain data processing system power limits 228. An example of data processing system power limits may be shown in FIG. 2H.

Once obtained, data processing system power limits 228 may be enforced on corresponding data processing systems. For example, instructions/information regarding the limits may be sent to various management components which may enforce the power consumption limit on the corresponding data processing system.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

To further clarify operation of data flows as discussed with respect to FIGS. 2A-2B, a set of tables are shown in FIGS. 2C-2H. The set of tables includes examples of results of calculations performed as part of the processes discussed with respect to FIGS. 2A-2B.

Turning to FIG. 2C, a first table in accordance with an embodiment is shown. The first table may include results of calculations performed during initialization of power management for a set of data processing systems.

Now, consider an example scenario where a set of ten data processing systems named S1 through S10 are housed in racks three racks named R1 through R3., To allocate limited power to the data processing systems, the flows shown in FIGS. 2A-2B may have been performed previously giving rise to the values for the calculations shown in FIG. 2C. The data processing system power limits may have been obtained using rack powers and dynamic weighted priorities. The rack powers may be obtained using the total budgeted power for all the data processing systems and rack weighted priorities. The rack weight priorities may be obtained using the dynamic weighted priorities for a rack.

For example, consider data processing system S1 from rack R1. As a result of the calculations previously performed, the data processing system power limit for S1 may be 1680 W. The data processing system power limit for S1 may be obtained from the product of the rack power for R1 (3360 W) and the dynamic weighted priority for S1 (5) divided by the sum of the dynamic weighted priorities for data processing systems S1-S3 in rack R1 (10). Thus, the data processing system power limit may be computed to be 3360 W*5/10=1680 W.

The rack power for R1 may be obtained from the product of a total budgeted power for racks R1-R3 (12000 W) and the rack weighted priority for racks R1-R3 (0.28). Thus, the rack power may be 12000 W*0.28=3360 W.

A rack weighted priority for R1 may be obtained by dividing the sum of the dynamic weighted priorities for rack R1 (10) by the sum of the dynamics weighted priorities for all the data processing systems in racks R1-R3 (36). Thus, the rack weighted priority for rack R1 is 10/36=0.28.

The dynamic weighted priority for data processing system S1 may be obtained using telemetry data from the data processing system. Refer to FIGS. 2D-2G for additional information regarding obtaining dynamic weighted priorities for data processing systems.

Thus, using the table shown in FIG. 2C, embodiments disclosed herein may facilitate initialization of power management for a set of data processing systems.

Now, consider a second scenario where, over time, the telemetry data from the data processing system changes. This change in telemetry data may make the power allocations for the data processing systems stale and/or otherwise undesirable. Consequently, the power allocations may be updated by using the new telemetry data to calculate new dynamic weighted priorities which in turn may be used to establish the power allocations. FIGS. 2D-2G show results of calculations used in identifying new dynamic weighted priorities based on new telemetry data and FIG. 2H shows results of calculations in establishing power allocation using the updated dynamic weights.

Turning to FIG. 2D, a second table in accordance with an embodiment is shown. The second table may illustrate results of calculations performed during initialization of data processing system efficiencies and power consumptions for a set of data processing systems.

In FIG. 2C, data processing system power limits were computed for the set of the data processing systems. To update power consumption limits of the set of the data processing systems, FIG. 2D may illustrate updating of data processing system efficiencies weights and power consumptions weights. In addition, a weight may be defined for a data processing system efficiency (0.5) and power consumption (0.5) for all the data processing systems S1-S10. The weights may be defined, for example, by an administrator, a subject matter expert, through an automated process, and/or via other methods.

For example, the data processing system power efficiency for data processing system R1 may be obtained by (i) calculating a weighted sum of all of the portions of telemetry data from data processing system R1 that indicates the relative efficiency of use of power by data processing system R1 in performing workloads, and (ii) ascribing a numerical value (e.g., normalized to a 1-10 range) for the data processing system efficiency weight for data processing system R1 using a formula or other process (e.g., may output the numerical value). For example, telemetry data for data processing system R1 may indicate that the data processing system has a power efficient processor (e.g., given a score of 3), but has a relatively low rate of completing workloads (e.g., given a score of 1). In this example, the weighted sum may weight the power efficient processor with a factor of 2 and the relatively low rate of completing workloads with a score of 1 giving a weight sum of 8 (e.g., 3*2+1*2=8).

Similar processes may be performed for the power consumption weight for data processing system R1.

Thus, using the table shown in FIG. 2D, embodiments disclosed herein may facilitate initialization of data processing system efficiencies and power consumptions for a set of data processing systems.

Turning to FIG. 2E, a third table in accordance with an embodiment is shown. The third table may include results of calculations performed during normalization of data processing system efficiencies and power consumptions for a set of data processing systems.

To update dynamic weighted priorities from FIG. 2C, data processing system efficiency weights and power consumption weights may first need to be normalized. The data processing system efficiency weights are normalized by dividing the data processing system efficiency weights by the maximum data processing system efficiency weight. Similarly, power consumption weights are normalized by dividing the power consumption weights by the maximum power consumption weight.

Turning to FIG. 2F, a fourth table in accordance with an embodiment is shown. The fourth table may include results of calculations performed during scaling of normalized data processing system efficiency weights and normalized power consumption weights for a set of data processing systems.

To continue updating the dynamic weighted priorities from FIG. 2C, normalized data processing system efficiency weights and normalized power consumption weights may need to be scaled. Normalized data processing system efficiency weights may be scaled according to the weight to the data processing system efficiency of the set of the data processing systems, which is 0.5. Similarly, normalized power consumption weights may be scaled according to the weight to the power consumption of the set of the data processing systems, which is 0.5.

Turning to FIG. 2G, a fifth table in accordance with an embodiment is shown. The fifth table include results of calculations performed during determination of dynamic weighted priorities for a set of data processing systems.

For each data processing system, a scaled normalized data processing system efficiency weight and a scaled normalized power consumption weight may be summed. The sum of the scaled normalized data processing system efficiency weight and the scaled normalized power consumption weight may produce a score for each data processing system. Each score of the set of scores for the data processing systems may be compared to a score range. For example, for data processing system S1, the score may be 0.677. Since 0.677 exists within 0.4 and 0.599, then a dynamic weighted priority for S1 may be set to 3. For data processing system S4, the score may be 1. Since the score for S4 may fall within 0.8 and 1.0, then a dynamic weighted priority for S4 may be set to 1.

Not seen in FIG. 2G may be score ranges for dynamic weighted priorities of 1 and 4. If a score may have been computed that exists within 0.1 and 0.199, then a dynamic weighted priority may have been set to 1. Similarly, if a score may have been computed that exists within 0.6 and 0.799, then a dynamic weighted priority may have been set to 4.

Turning to FIG. 2H, a sixth table in accordance with an embodiment is shown. The sixth table may include results of calculations performed during updating data processing system power limits using updated dynamic weighted priorities.

Using dynamic weighted priorities from FIG. 2G, data processing system power limits for the set of the data processing systems may be updated. Updating the data processing system power limits may utilize computations from the description of FIG. 2C. In continuing operation of power management of the set of the data processing systems, telemetry data from the set of the data processing systems may be ingested and computations from descriptions of FIG. 2D-2G may be repeated.

As discussed above, the components of FIG. 1 may perform various methods to manage power consumption in data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing power consumption in data processing systems in accordance with an embodiment is shown. The method may be performed, for example, by any of the components of the system of FIG. 1, and/or other components not shown therein.

At operation 300, telemetry data may be obtained for data processing systems. The telemetry data may be obtained by obtaining data based on power consumptions and data processing system efficiencies from the data processing systems.

At operation 302, weights for the data processing systems may be obtained using the telemetry data. The weights for the data processing systems may be obtained by (a) obtaining the data processing system efficiencies and the power consumptions for the data processing systems using the telemetry data; (b) obtaining, using the data processing system efficiencies and the power consumptions, normalized data processing system efficiencies and normalized power consumptions; and (c) obtaining, using the normalized data processing system efficiencies and normalized power consumptions, weights for the data processing systems.

The data processing system efficiencies and the power consumptions for the data processing systems may be obtained by ingesting the telemetry data. The normalized data processing system efficiencies and the normalized power consumptions may be obtained by dividing the data processing system efficiencies by a maximum data processing system efficiency to obtain normalized data processing system efficiencies and by dividing the power consumptions by a maximum power consumption to obtain normalized power consumptions. The weights for the data processing systems may be obtained by (a) scaling the normalized data processing system efficiencies and normalized power consumptions; (b) summing the normalized data processing system efficiencies and normalized power consumptions to obtain summed scores; and (c) rating the summed scores with an integer value from 1 to 5 as weights for the data processing systems.

At operation 304, the power consumption limits for the data processing systems may be obtained using the weights for the data processing systems. The power consumption limits may be obtained by (a) obtaining, based on the weights for the data processing systems, rack weights; (b) obtaining, based on the rack weights and a total power budgeted for use by the data processing systems, rack power limits; and (c) obtaining, based on the rack power limits and the weights for the data processing systems, the power consumption limits for the data processing systems.

The rack weights may be obtained by computing the rack weights using dynamic weighted priorities of the data processing systems. The rack power limits may be obtained by computing the rack power limits using the rack weights and a total budgeted power for the data processing systems. The power consumption limits may be obtained by computing the power consumption limits using the rack power limits and the dynamic weighted priorities.

At operation 306, operation of the data processing systems may be updated to prevent the data processing systems from exceeding the power consumption limits. The operation of the data processing systems may be updated by implementing the power consumption limits for the data processing systems.

The method may end following operation 306.

Figure 4:
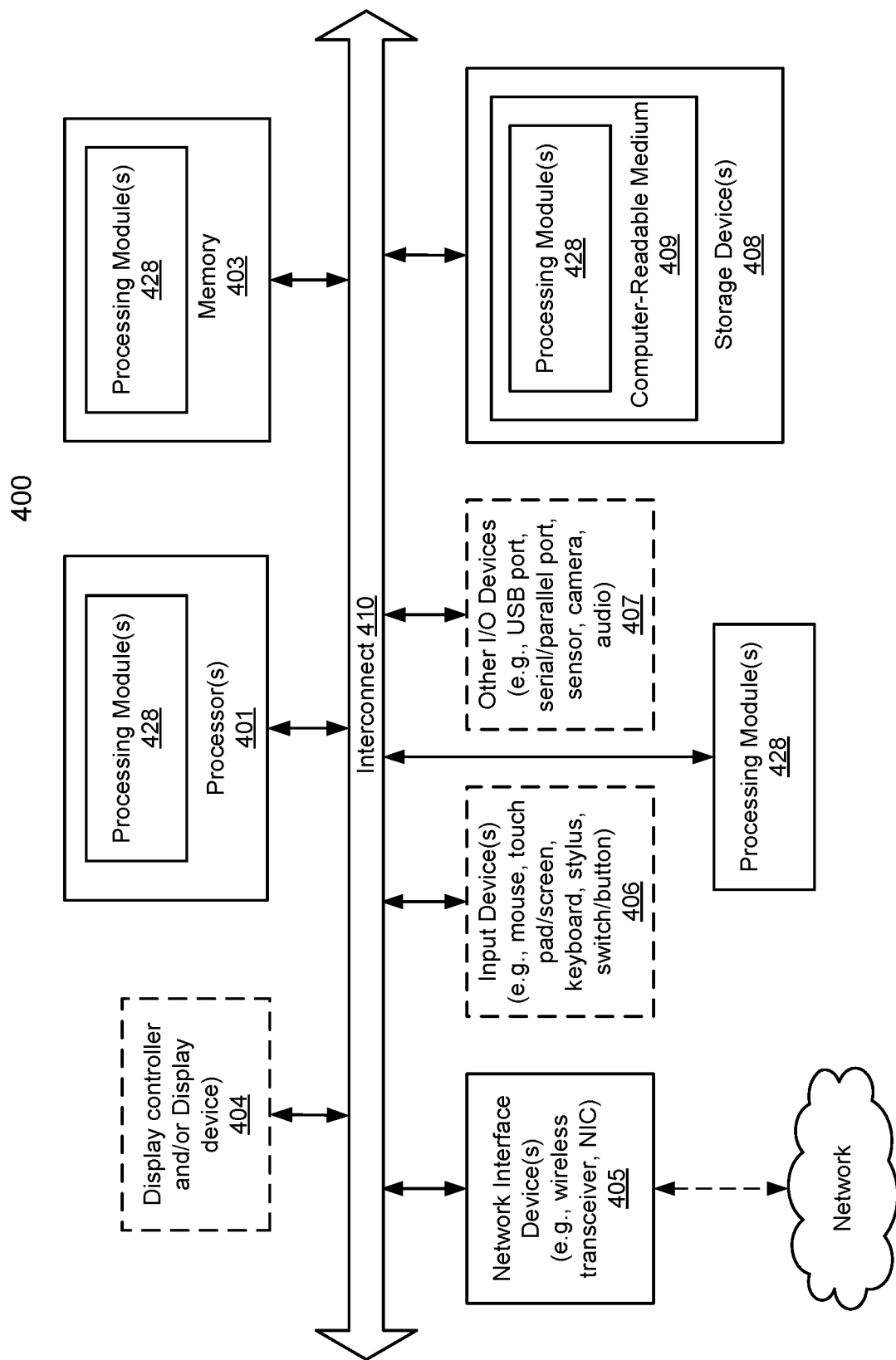
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

The invention claimed is:

1. A method for managing power consumption in data processing systems, the method comprising:
   obtaining telemetry data for the data processing systems, the telemetry data comprising:
      first data based on data processing system efficiencies of the data processing systems, and
      second data based on power consumptions of the data processing systems;
   obtaining data processing system efficiencies and the power consumptions for the data processing systems using the telemetry data;
   obtaining, using the data processing system efficiencies and the power consumptions, normalized data processing system efficiencies and normalized power consumptions;
   obtaining, using the normalized data processing system efficiencies and normalized power consumptions, weights for the data processing systems;
   obtaining, using the weights for the data processing systems, power consumption limits for the data processing systems; and
   updating operation of the data processing systems to prevent the data processing systems from exceeding the power consumption limits.

2. The method of claim 1, wherein the data processing system efficiencies indicate a level of workload performance of the data processing systems for a given level of power consumption by the data processing systems.

3. The method of claim 2, wherein a data processing system efficiency of the data processing system efficiencies is based, at least in part, on:
   a hardware component loadout of a data processing system of the data processing systems;
   configurations of the data processing system; and
   historical performance of workloads by the data processing system.

4. The method of claim 1, wherein the power consumption limits impose maximum power usages by the data processing systems.

5. The method of claim 1, wherein obtaining the power consumption limits comprises:
   obtaining, based on the weights for the data processing systems, rack weights for racks in which portions of the data processing systems are positioned;
   obtaining, based on the rack weights and a total power budgeted for use by the data processing systems, rack power limits for the racks; and
   obtaining, based on the rack power limits and the weights for the data processing systems, the power consumption limits for the data processing systems.

6. The method of claim 5, wherein the rack power limits impose maximum power usages by a rack of the racks, the rack housing a portion of the portions of the data processing systems.

7. The method of claim 6, wherein the rack weights prioritize power for allocation to racks that house the portions of the data processing systems.

8. A non-transitory machine-readable medium having instructions stored therein, which when executed by a processor, cause the processor to perform operations for managing power consumption in data processing systems, the operation comprising:
   obtaining telemetry data for the data processing systems, the telemetry data comprising:
      first data based on data processing system efficiencies of the data processing systems, and
      second data based on power consumptions of the data processing systems;
   obtaining data processing system efficiencies and the power consumptions for the data processing systems using the telemetry data;
   obtaining, using the data processing system efficiencies and the power consumptions, normalized data processing system efficiencies and normalized power consumptions;
   obtaining, using the normalized data processing system efficiencies and normalized power consumptions, weights for the data processing systems;
   obtaining, using the weights for the data processing systems, power consumption limits for the data processing systems; and
   updating operation of the data processing systems to prevent the data processing systems from exceeding the power consumption limits.

9. The non-transitory machine-readable medium of claim 8, wherein the data processing system efficiencies indicate a level of workload performance of the data processing systems for a given level of power consumption by the data processing systems.

10. The non-transitory machine-readable medium of claim 9, wherein a data processing system efficiency of the data processing system efficiencies is based, at least in part, on:
   a hardware component loadout of a data processing system of the data processing systems;
   configurations of the data processing system; and
   historical performance of workloads by the data processing system.

11. The non-transitory machine-readable medium of claim 8, wherein the power consumption limits impose maximum power usages by the data processing systems.

12. The non-transitory machine-readable medium of claim 8, wherein obtaining the power consumption limits comprises:
   obtaining, based on the weights for the data processing systems, rack weights for racks in which portions of the data processing systems are positioned;
   obtaining, based on the rack weights and a total power budgeted for use by the data processing systems, rack power limits for the racks; and
   obtaining, based on the rack power limits and the weights for the data processing systems, the power consumption limits for the data processing systems.

13. The non-transitory machine-readable medium of claim 12, wherein the rack power limits impose maximum power usages by a rack of the racks, the rack housing a portion of the portions of the data processing systems.

14. The non-transitory machine-readable medium of claim 13, wherein the rack weights prioritize power for allocation to racks that house the portions of the data processing systems.

15. A data processing system, comprising:
a processor; and
a memory coupled to the processor to store instructions, which when executed by the processor, cause the processor to perform operations for managing power consumption in data processing systems, the operations comprising:
obtaining telemetry data for the data processing systems, the telemetry data comprising:
first data based on data processing system efficiencies of the data processing systems, and
second data based on power consumptions of the data processing systems;
obtaining data processing system efficiencies and the power consumptions for the data processing systems using the telemetry data;
obtaining, using the data processing system efficiencies and the power consumptions, normalized data processing system efficiencies and normalized power consumptions;
obtaining, using the normalized data processing system efficiencies and normalized power consumptions, weights for the data processing systems;
obtaining, using the telemetry data, weights for the data processing systems;
obtaining, using the weights for the data processing systems, power consumption limits for the data processing systems; and
updating operation of the data processing systems to prevent the data processing systems from exceeding the power consumption limits.

16. The data processing system of claim 15, wherein the data processing system efficiencies indicate a level of workload performance of the data processing systems for a given level of power consumption by the data processing systems.

17. The data processing system of claim 16, wherein a data processing system efficiency of the data processing system efficiencies is based, at least in part, on:
a hardware component loadout of a data processing system of the data processing systems;
configurations of the data processing system; and
historical performance of workloads by the data processing system.

18. The data processing system of claim 15, wherein obtaining the power consumption limits comprises:
obtaining, based on the weights for the data processing systems, rack weights for racks in which portions of the data processing systems are positioned;
obtaining, based on the rack weights and a total power budgeted for use by the data processing systems, rack power limits for the racks; and
obtaining, based on the rack power limits and the weights for the data processing systems, the power consumption limits for the data processing systems.

19. The data processing system of claim 18, wherein the rack power limits impose maximum power usages by a rack of the racks, the rack housing a portion of the portions of the data processing systems.

20. The data processing system of claim 19, wherein the rack weights prioritize power for allocation to racks that house the portions of the data processing systems.

* * * * *